RECORD CONTROLLED MACHINE

Filed June 25, 1949 4 Sheets-Sheet 1

INVENTOR
ORVILLE B. SHAFER
BY [signature]
ATTORNEY

Jan. 6, 1953 Q. B. SHAFER 2,624,459

RECORD CONTROLLED MACHINE

Filed June 25, 1949 4 Sheets-Sheet 2

INVENTOR
ORVILLE B. SHAFER
BY [signature]
ATTORNEY

Jan. 6, 1953 O. B. SHAFER 2,624,459

RECORD CONTROLLED MACHINE

Filed June 25, 1949 4 Sheets-Sheet 3

INVENTOR
ORVILLE B. SHAFER
BY [signature]
ATTORNEY

RECORD CONTROLLED MACHINE

Filed June 25, 1949 4 Sheets-Sheet 4

INVENTOR
ORVILLE B. SHAFER
BY E W Gifford
ATTORNEY

Patented Jan. 6, 1953 2,624,459

UNITED STATES PATENT OFFICE 2,624,459

RECORD CONTROLLED MACHINE

Orville B. Shafer, Owego, N. Y., assignor to International Business Machines Corporation, New York, N. Y., a corporation of New York Application June 25, 1949, Serial No. 101,367

13 Claims. (Cl. 209—110)

Figure 1A:
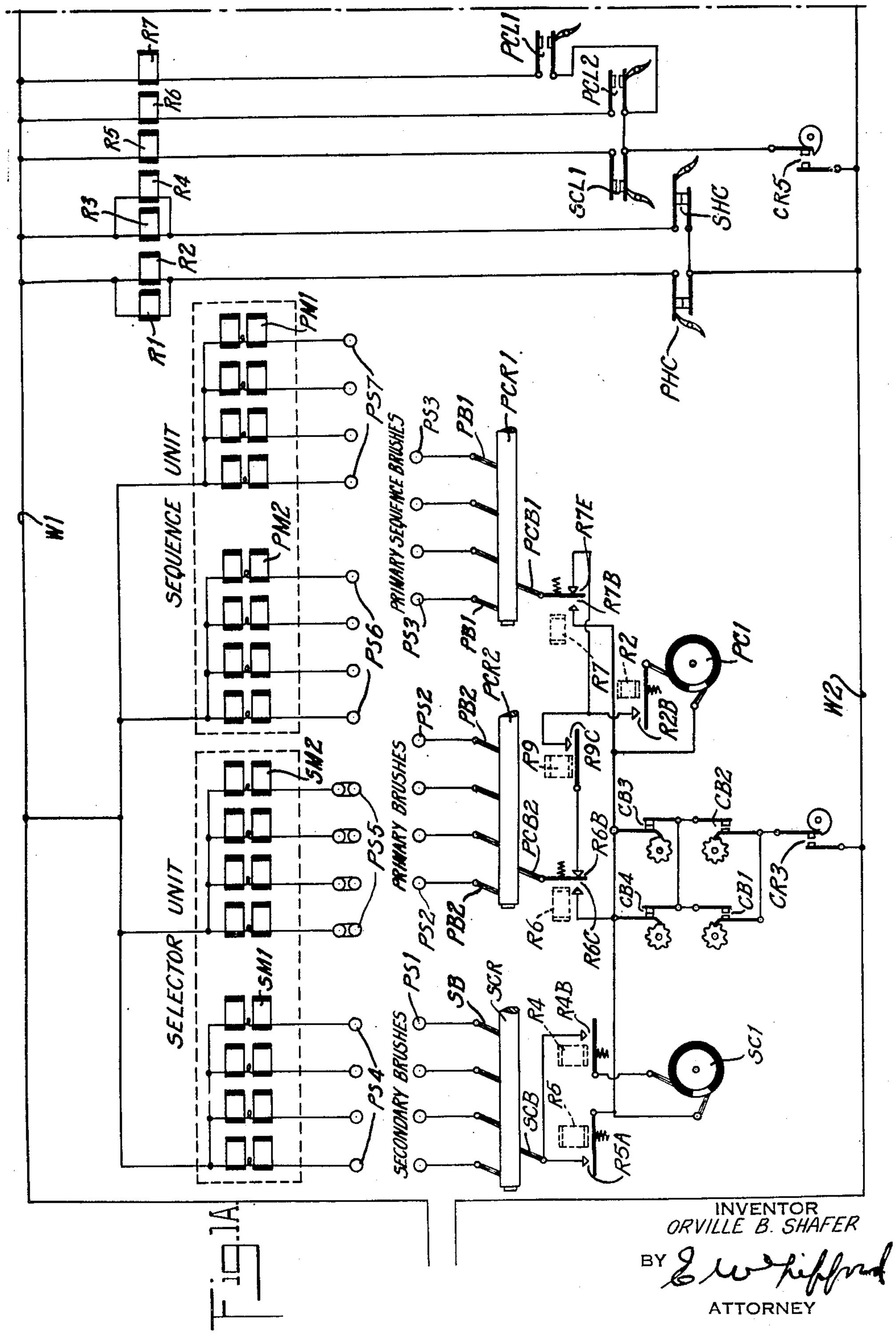

This invention relates to record-controlled machines and is an improvement in the machine disclosed in Patent 2,379,828. A machine of the type disclosed in this patent is commonly known in the art as a "collator."

The primary object of the invention is to provide a device capable of selecting records on the basis of the number of fields thereof which are identically punched in comparison with a predetermined standard of likenesses.

The purpose of the invention is to select records having a plurality of fields of data, each field always having recorded therein certain classifications, on the basis of the number of fields which are identical in comparison with a predetermined standard of comparison which, in the illustrative form of the invention, is incorporated in the machine by an initially fed "finder" record on which are recorded the facts with respect to which identity is sought.

The invention has particular utility in record-controlled machines used by law enforcement bureaus to select records of criminals or crimes maintained on the basis of their characteristics of operation as criminals.

The characteristics of behavior of criminals in the commission of their crimes which are recorded for purposes of facilitating investigation of crimes is known as a "modus operandi" file. It consists of keeping a file of criminals or crimes on the basis of characteristic habits in the commission of crimes so that, when a crime is committed by an unknown criminal, the behavior characteristics of the unknown criminal may be compared with the modus operandi records to determine whether the crime has been committed by an old offender. In a very large number of cases, criminals released from prison immediately go back to their original habits in the commission of crimes and often their apprehension is speedily obtained because of their characteristics of operation which, to experienced police officers, point out a particular criminal.

The search of criminal record files to select those records which come closest to the modus operandi of unknown criminals is very time consuming and in crime prevention time is of the essence.

The present invention is directed toward the provision of a simple modification in the circuits of the machine disclosed in Patent 2,379,828 which will enable modus operandi searches of the criminal record files to be effected very quickly so that suspects may be apprehended and questioned before the criminal has had an opportunity to escape the jurisdiction of the officers investigating the crime, time being of the essence in such matters.

Summarizing, the purpose of the invention is to provide a circuit arrangement which enables record cards to be selected on the basis of a number of fields in which identity exists with respect to predetermined data and without regard to the physical position on the record card of the fields in which identical data is recorded. In other words, any identity is immediately established in the machine as a single identity, and a second or third identity is accumulative in effect even though it may occur in any of the fields which may be likely to contain identical data.

Other objects of the invention will be pointed out in the following description and claims and illustrated in the accompanying drawings, which disclose, by way of example, the principle of the invention and the best mode, which has been contemplated, of applying that principle.

Figure 1B:
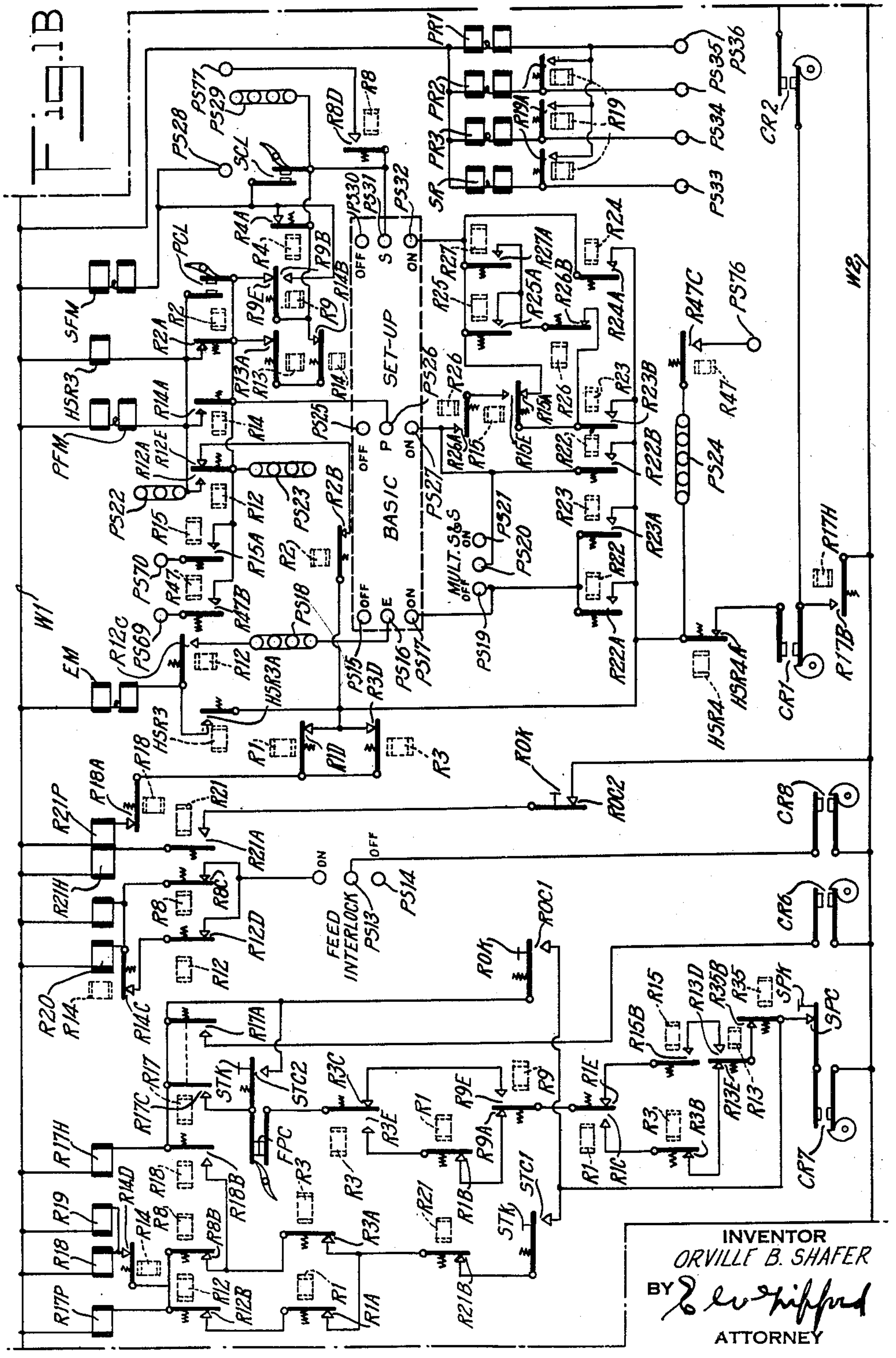
Figure 1C:
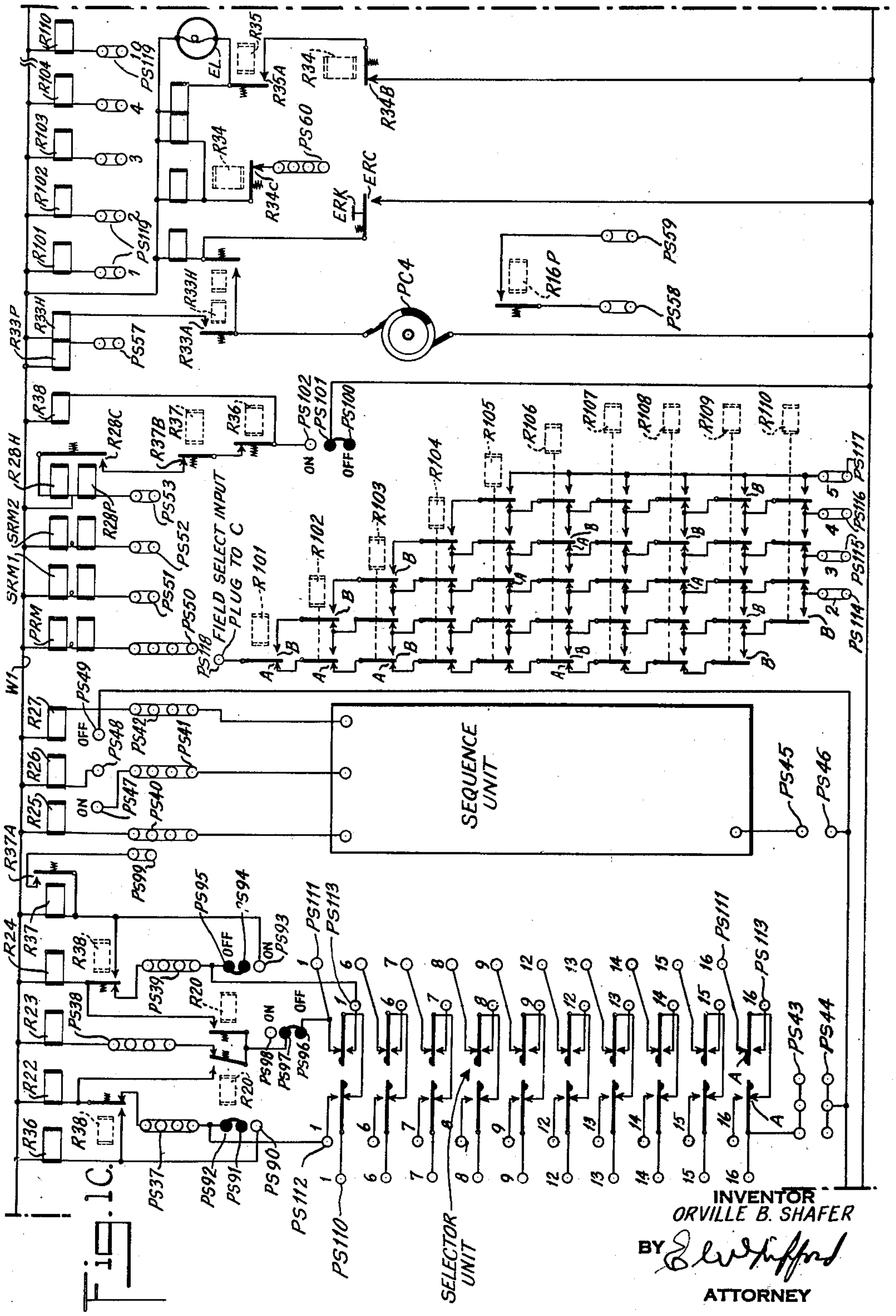

In the drawings:

Figs. 1A, 1B, and 1C constitute a partial wiring diagram of the machine.

Figure 2:
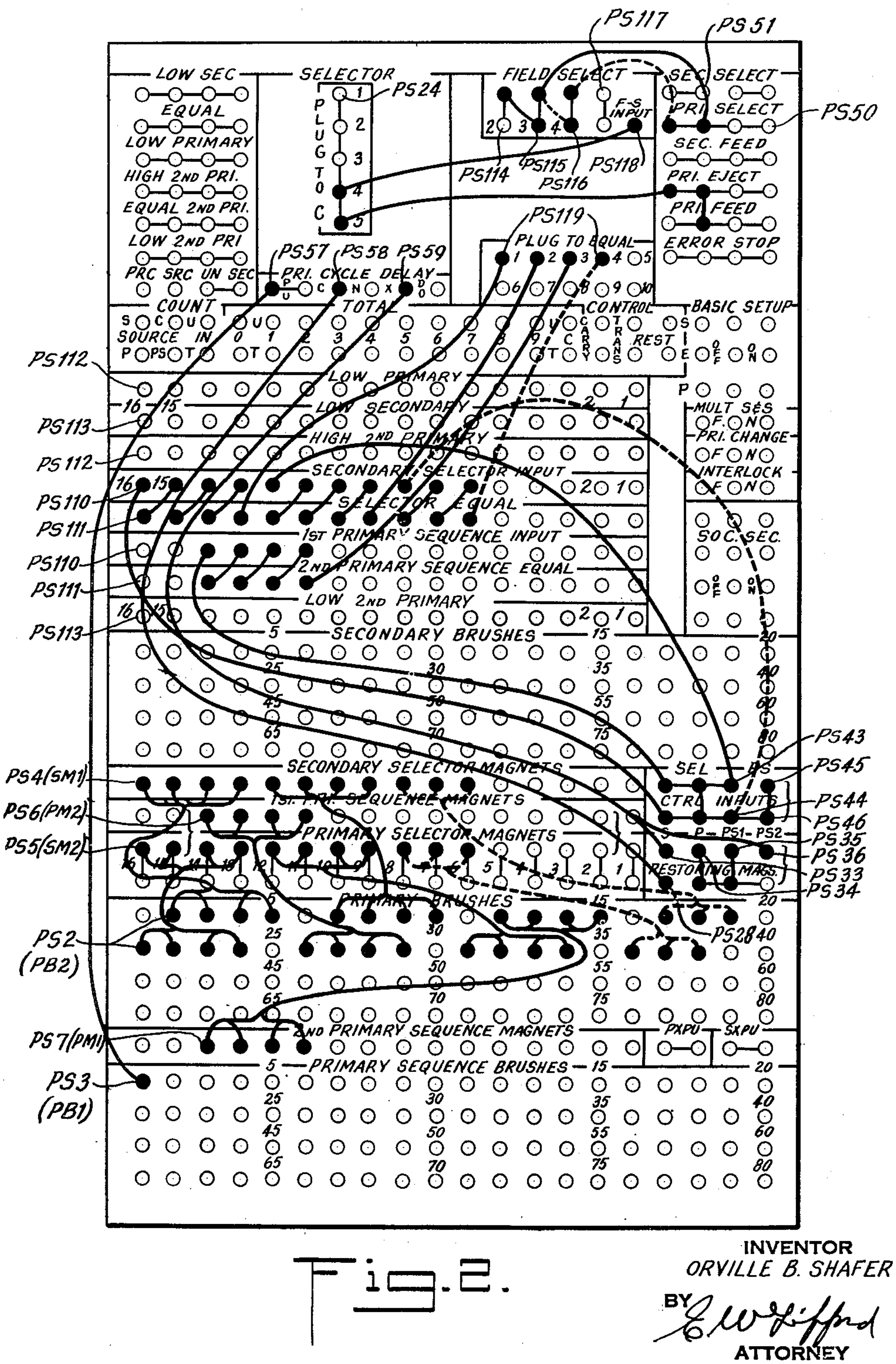

Fig. 2 is a plugboard chart.

The modus operandi data is recorded in the cards by assigning a plurality of fields for the reception of data as to the criminal, the characteristics of the commission of crime, and the manner of operation of the criminal. The particular order or arrangement of these fields on the card and the number of columns assigned to each is of no significance in the present case. The condition to be satisfied is that certain kinds of data always be recorded in a particular column or field. For example, the card will have columns assigned to the reception of data as to the age, occupation, type of crime, physical description, and other characteristics of a known criminal, and these facts will always be recorded in the columns or fields assigned thereto.

When a crime is committed by an unknown criminal, the facts pertaining thereto are quickly gathered by the investigating officers and thereafter it is desirable to search the criminal records for criminals whose description and operating characteristics come the closest to the facts obtained during investigation of the crime, since there is a strong possibility that the crime may have been committed by an old offender or at least by a person who has been arrested as a suspect in connection with similar crimes even when the suspect may have been freed for lack of evidence.

The known facts as to the commission of the crime will be punched on a finder card which will be placed at the head of the file of cards for known criminals or crimes and fed through the machine disclosed in the above patent. In the present case only the primary side of the machine will be used since only one file of cards is involved.

In order to carry out the objects of the invention, the comparing units disclosed in the above patent have been modified to enable the equal switch contacts to be independently connected in series in separate groups in each of which one or more switches for one or more positions or orders of the comparing units are connected as an independent series circuit. With this arrangement, if an equal exists in a selected part of the comparing unit, a separate equal control circuit may be established to one of a series of equal selector relays, instead of a single straight through equal circuit to a single equal relay as is ordinarily done. The wiring of the switch contacts of the comparing units to accomplish this result is illustrated in Fig. 1C by the selector unit located at the extreme left and it will be understood that the sequence unit is wired in identical fashion.

In Fig. 1C, there is shown a modified form of switch mechanism similar to the one disclosed in Patent 2,442,970 in which the molded switch contact assembly of Fig. 9 of Patent 2,379,828 is replaced by banks of transfer type relay contacts. This enables the switch contacts to be connected to individual plug sockets, permitting splitting of the comparing units into sections, each associated with a separate column or group of columns of the record card. Modifying the comparing units in this fashion makes it possible to test for equality in a plurality of separate fields simultaneously. The two equal contacts A for each position are both closed when two compared columns are equal and are connected in series to two separate equal plug sockets PS110, PS111. The unequal contacts B are connected to plug sockets PS112, PS113.

It will be noted in Fig. 1C that the two normally closed equal contacts A for position 6, for example, are connected in series to two plug sockets PS110, PS111 and that the normally open unequal contacts B are connected to the plug sockets PS112, PS113. The plug sockets PS112, PS113 are provided for the purpose of using the comparing units in the normal way.

There also is provided ten equal selector relays designated R101 to R110 which are provided with the plug socket PS119. These relays control a cascade network of contacts A, B shown in Fig. 1C arranged between a field selection input socket PS118 and four field selection out-put plug sockets PS114 to PS117. The number of fields plugged is indicated by the small numbers 1 to 10 adjacent plug sockets PS119 and the number of identical fields is indicated by the small numbers 2 to 5 adjacent plug sockets PS114 to PS117. It will be understood that, except for the modified wiring shown in Fig. 1C, the machine may be identical to the machine of Patent 2,379,828 and operates in the same way.

The machine is plugged as shown in Fig. 2. Because of the complexity of wiring which would result if it were attempted to show the plug wires for all of the card sensing brushes, of which only the primary brushes PB1, PB2 are to be used, the connections from the brushes to the comparing magnets PM1, PM2, SM1, SM2 is shown as a cable connection in Fig. 2. For example the secondary selector magnets SM1 for positions 13 to 16, inclusive, are connected to the brushes PB2 for columns 5, 4, 3, and 2, respectively.

The finder card is punched with the selection data in columns 2 to 5, 7 to 10, and 12 to 15, so that a search will be made for an identity in these three fields of the card. The finder card is placed at the head of the file of cards and the machine started in the usual way. When the finder card passes the first set of brushes PB1, corresponding to the plug sockets PS3, the primary cycle delay relay R33P (Fig. 1C) is energized through the plug wire connection between the plug sockets PS3 and PS57 thereby energizing relay R16P in the usual way closing a circuit between the plug sockets PS58 and PS59 in the usual way. This allows the secondary side of the selector unit and the second primary side of the sequence unit to be reset in readiness to receive the data from the finder card when it passes the second set of brushes PB2.

During the second cycle the data recorded in columns 2 to 5, 7 to 10, and 12 to 15 of the finder card will be entered in the secondary side of the selector unit by energizing the secondary selector magnets SM1, and in the second primary side of the sequence unit by energizing the second primary sequence magnets PM1.

At this point it should be explained that for present purposes the two comparing units are operating as if they were in series to obtain expanded capacity, although the equal contacts are not in a complete single series circuit as they ordinarily would be when two comparing units are operating in series to obtain larger capacity for comparison.

At the end of the second cycle the machine has stored in positions 9 to 16 of the selector unit and positions 11 to 14 of the sequence unit the data which was recorded on the finder card.

Let it be assumed for convenience that all of the data in the first file card corresponds to the predetermined data already inserted in the machine. This will cause an equal condition to prevail in positions 9 to 16 of the selector unit and positions 11 to 14 of the sequence unit with the result that the contacts A of the comparing units will be set in closed condition for this particular card.

The contacts A of positions 13 to 16 of the selector unit are connected in series by the manner of plugging plug sockets PS110, PS111 between the plug socket PS44 and the plug socket PS119 thus causing relay R101 to be energized signifying that the data in one field of the second card is identical to the data in the corresponding field of the first card. Similarly the contacts A of positions 9 to 12 of the selector unit cause energization of relay R102 and the contacts A of positions 11 to 14 of the sequence unit cause the energization of relay R103.

It will be seen that the effect of the plugging in Fig. 2 is to divide the sequence unit and selector unit into three sections, each of which is responsive to data in one of three fields, but always the same three fields, on the file cards and in the present case three relays R101 to R103 are energized signifying three identities.

With reference to Figs. 1C and 2, it will be seen that the energizing of these three relays enables a circuit to be established from the plug socket PS24 to plug socket PS118, through the normally open points B of relays R101, R102, and R103 and thence through the normally closed points A of relays R104 to R110, to plug socket PS115, which, it will be noted, is designated with the small numeral 3 signifying three equal conditions. In the plugboard, Fig. 2, it will be seen that the plug sockets PS114 and PS115 are plugged to primary reject magnet PRM (see Fig. 1C also) through the primary select plug socket PS50 which causes this card to be selected from the file and deposited in the primary reject pocket which is designated PRJ in the patent. The machine in this respect functions in the usual way.

It will be seen that a card with three conditions of identity will be deposited in the reject pocket. Thus any card in which there are three identities will be selected and, in the manner of plugging shown in the plugboard, all cards with two or three identities also will be selected.

The three fields corresponding to the positions 13 to 16 and 9 to 12 of the selector unit and positions 11 to 14 of the sequence unit may be designated as fields A, B, and C and the case in which all three are identical has been treated above.

Let it be assumed that only one field, field B, for example, is identical. In such case only relay R102 will be energized and the primary select magnet PRM will not be energized because the series circuit through the contacts of the relays R101 to R110 can extend only to the extreme left hand normally open contacts B of relay R110. Consequently, when only one field is identical, no selection circuit is set up and the card will be deposited in the pocket M S devoted to the merged sets in the patent. If field C only is identical, relay R103 will be energized, but, since relay R110 was not energized, the circuit will be open as before at the extreme left hand open contacts B of relay R110.

It is immaterial where the identities exist so long as there are two or three. For example, if fields A and C were identical, relays R101 and R103 will be energized. This allows a circuit to be traced from the plug socket PS118 through the normally open contacts of relay R101, the normally closed contacts of relay R102, the normally open contacts of R103, through the normally closed contacts of relays R104 to R110 to the plug socket PS114 which is allocated to two identities.

The comparisons can be extended to a greater number by means of the dotted plugging shown in Fig. 2. In this case positions 6 to 8 of the selector unit are additionally made effective so that any card having from two to four identities will be selected. By removing the left hand plug wire inter-connecting plug sockets PS114 and PS115 (Fig. 2) the response will be only to either three or four identities. By shifting the solid and dotted line plugging of the plug sockets PS114, PS115, and PS116 bodily to the right to plug sockets PS115 to PS117, the response will be to three, four or five identities only.

It will thus be seen that at the end of the run there will be collected in the primary reject pocket all cards having from two to five identities according to the manner in which the plug sockets PS114 to PS117 are plugged to the primary select magnet PRM.

The primary side of the selector unit and the first primary side of the sequence unit are reset every cycle so as to be in condition to receive data from the file cards for comparison with the predetermined data on the finder card. The reset magnets for the secondary side of the selector unit and the second primary side of the sequence unit are connected by a split plug wire to the normally open contacts of the cycle delay relay R16P which, it will be remembered, are only closed to permit resetting of these two sides of the comparing units once prior to the analysis of the finder card and open to enable the data on the finder card to be retained in the machine for the duration of the run.

The circuit arrangement shown in Fig. 1C has a capacity for splitting the comparing units into a maximum of ten fields and can integrate from two to five identities. Obviously the number of equal selector relays can be increased, if need be, to provide for a greater number of fields, and/or the number of contacts in the network can be increased to obtain a larger range of integration of the identities.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record distributing machine, means to feed a file of records having a plurality of separate data fields each field having data designations, said file being preceded by a finder record having a plurality of fields corresponding in significance to the fields of the file records and having designations of data to be compared with the data in the file records; means to sense said designations, data comparing means controlled by the sensing means and having means to split the comparing means into a plurality of separate comparing sections, each section corresponding to one of the fields of the file records, each section having means for storing the data in one of the fields of the finder record and for receiving data in the corresponding field of the file record for comparing a field in the finder record with said corresponding field of each file record; means made operative by said sections for integrating the number of fields in a file record which agree with fields of the finder record, and means controlled by the integrating means for segregating file records having predetermined numbers of fields identical from the remainder of the file.

2. In a record distributing machine, means to feed records having a plurality of different data recording areas, each area containing data designations representing certain classifications; means to sense said designations, data comparing means controlled by the sensing means and having means for splitting the comparing means into a plurality of comparing sections, each section corresponding to one of said areas and having means for retaining a predetermined classification and comparing said classification with the designations in the corresponding areas of the records, means made operative by said section for integrating the comparisons to ascertain the number of areas of each record which are identical to the predetermined classifications, and means controlled by the integrating means for segregating the records having predetermined numbers of identities of classification from the others.

3. In a record controlled machine, means to feed records having a plurality of classification fields, each field having classification designations; means to sense said classification designations, comparing means controlled by said designations and having a plurality of sections, one for each of said fields, each section having means for rendering it responsive to only a certain classification; means made operative by said sections to integrate the number of sections which agree with a record sensed by the sensing means, and machine control means made responsive by said integrating means only when predetermined numbers of classification identities exist in said records.

4. In a record controlled machine, means to feed records having a plurality of classification fields, each field having classification designations; means to sense said classification designations, comparing means controlled by said designations and having a plurality of sections, one for each of said fields, each section having means for rendering it responsive to only a certain classification; means rendered effective by said sections to integrate the number of sections which agree with a record sensed by the sensing means, record distributing mechanism; and means made operative by the integrating means for causing the distributing means to distribute the records having predetermined numbers of classification identities differently from the others.

5. In a record controlled machine, means to feed records having a plurality of classification fields, each field having classification designations; means to sense said classification designations, comparing means controlled by said designations and having a plurality of sections, one for each of said fields, each section having means for rendering it responsive to only a certain classification; means controlled by said sections to integrate the number of sections which agree with a record sensed by the sensing means, record distributing mechanism, and means controlled by the integrating means for controlling the record distributing mechanism according to the number of classification identities in the records.

6. In a record controlled machine, means to feed records having a plurality of classification fields, each field having classification designations; means to sense said classification designations, comparing means controlled by said designations and having a plurality of sections, one for each of said fields, each section having means for rendering it responsive to only a certain classification; means controlled by said sections to integrate the number of sections which agree with a record sensed by the sensing means, including means to predetermine the numbers of identities to which the integrating means is responsive; and machine control means responsive to said integrating means only when predetermined numbers of classification identities exist in said records.

7. In a record controlled machine, means to feed records having a plurality of classification fields, each field having classification designations; means to sense said classification designations, comprising means controlled by said designations and having a plurality of sections, one for each of said fields, each section having means for rendering it responsive to only a certain classification; means made effective by said sections to integrate the number of sections which agree with a record sensed by the sensing means, including means to predetermine the numbers of identities to which the integrating means is responsive; record distributing mechanism; and means controlled by the integrating means for causing the distributing means to distribute the records having predetermined numbers of classification identities differently from the others.

8. In a record controlled machine, means to feed records having a plurality of classification fields, each field having classification designations; means to sense said classification designations, comparing means controlled by said designations and having a plurality of sections, one for each of said fields, each section having means for rendering it responsive to only a certain classification; means responsive to the condition of said sections to integrate the number of sections which agree with a record sensed by the sensing means, including means to predetermine the numbers of identities to which the integrating means is responsive; record distributing mechanism, and means controlled by the integrating means for controlling the record distributing mechanism according to the number of classification identities in the records.

9. In a record distributing machine, means to feed a file of records having a plurality of separate data fields each field having data designations, said file being preceded by a finder record having a plurality of fields corresponding in significance to the fields of the file records and having designations of data to be compared with the data in the file records; means to sense said designations, data comparing means controlled by the sensing means and arranged to be capable of being split into a plurality of separate comparing sections, each section corresponding to one of the fields of the file records, each section having means for storing the data in one of the fields of the finder record and for receiving data in the corresponding field of the file record for comparing a field in the finder record with said corresponding field of each file record; means responsive to said sections for integrating the number of fields in a file record which agree with fields of the finder record, including means to predetermine the numbers of identities to which the integrating means is responsive; and means controlled by the integrating means for segregating file records having predetermined numbers of fields identical from the remainder of the file.

10. In a record distributing machine, means to feed records having a plurality of different data recording areas, each area containing data designations representing certain classifications; means to sense said designations, data comparing means controlled by the sensing means and having a plurality of comparing sections, each section corresponding to one of said areas and having means for retaining a predetermined classification and comparing said classification with the designations in the corresponding areas of the records, means made operative by said sections for integrating the comparisons to ascertain the number of areas of each record which are identical to the predetermined classifications, including means to predetermine the numbers of identities to which the integrating means in responsive; and means controlled by the integrating means for segregating the records having predetermined numbers of identities of classification from the others.

11. In a machine of the class described, means to sense classification designations in a plurality of fields of successively presented records; means to store in the machine a plurality of classifications, one for each of said fields, for comparison with the designations in said fields, means controlled by the sensing means for comparing the stored classifications with the designations in the record fields, means made effective by the comparing means to determine the number of fields in the records which agree with the stored classifications, and control means rendered effective by the determining means when predetermined numbers of classifications in the records agree with the stored classifications.

12. In a machine of the class described, means to feed records having a plurality of classification fields each field having classification designations; means to sense said designations including electrical contact means closed in accordance with the classification designations, comparing means including one series of comparing circuits closed by said contact means in accordance with classification designations in an initially fed record and a second series of circuits closed in accordance with classification designations on succeeding record and also including groups of comparion contact devices for denoting agreement between the classification designations in corresponding fields of the initially fed record and succeeding records, separate integrating circuits each including the comparison contact devices for one field, means controlled by said circuits for determining the number of agreeing fields in a record and settable to respond to a predetermined number of equals, and machine controlled means rendered operative by the determining means.

13. In a machine of the class described, means to feed records having a plurality of separate fields comprising one or more denominational orders, each field having data designations and arbitrarily disposed on said records; means to sense said designations including contact means operated under control of said designations; a multi-order comparing mechanism including two series of opposed comparing circuits with means to connect said circuits to said contact means on a denominational basis to divide the comparing mechanism into comparing sections, one for each field, each comparing order including sequence contact means operated in accordance with the sequence relationship between designations for a single order in the fields compared, a series of integrating devices, means to connect the sequence contact means corresponding to a single field in a single circuit with one of said integrating devices, and means controlled by the integrating devices for setting up a control circuit when a given record has a predetermined number of a particular sequence relationship.

ORVILLE B. SHAFER.

REFERENCES CITED

The following references are of record in the file of this patent:

UNITED STATES PATENTS

| Number | Name | Date |
|---|---|---|
| 2,172,756 | Maschmeyer | Sept. 12, 1939 |